US008761965B2

(12) United States Patent
Righi et al.

(10) Patent No.: US 8,761,965 B2
(45) Date of Patent: Jun. 24, 2014

(54) AUTOMATIC CONTROL OF AN AIRCRAFT IN THE EVENT OF FLIGHT CREW INCAPACITY

(75) Inventors: Luigi P. Righi, Laguna Hills, CA (US); Mark A. Talbot, Huntington Beach, CA (US); Gregory M. Wellbrook, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 477 days.

(21) Appl. No.: 12/939,216

(22) Filed: Nov. 4, 2010

(65) Prior Publication Data

US 2012/0116610 A1 May 10, 2012

(51) Int. Cl.
*G01C 22/00* (2006.01)

(52) U.S. Cl.
USPC ....... 701/3; 701/8; 701/11; 701/300; 701/301

(58) Field of Classification Search
USPC .............. 701/2–11, 14, 16, 117, 300, 301, 23
See application file for complete search history.

(56) References Cited

U.S. PATENT DOCUMENTS

| 6,828,921 | B2 | 12/2004 | Brown et al. |
| 7,356,336 | B2 | 4/2008 | Perez et al. |
| 8,145,364 | B2 * | 3/2012 | Mira ................................. 701/3 |
| 8,180,503 | B2 * | 5/2012 | Estabrook et al. ................ 701/3 |
| 2003/0034902 | A1 | 2/2003 | Dickau |
| 2004/0107027 | A1 * | 6/2004 | Boudrieau ........................ 701/1 |
| 2005/0216138 | A1 | 9/2005 | Turung |
| 2010/0174426 | A1 * | 7/2010 | Turung ........................... 701/11 |

FOREIGN PATENT DOCUMENTS

| EP | 2 050 671 A1 | 4/2009 |
| GB | 2 381 879 A | 5/2003 |
| WO | 03/045782 A1 | 6/2003 |

OTHER PUBLICATIONS

European Patent Office, PCT International Search Report and Written Opinion for International Application No. PCT/US2011/053114 dated Nov. 22, 2011.

* cited by examiner

*Primary Examiner* — Richard Camby
(74) *Attorney, Agent, or Firm* — Charles L. Moore; Moore & Van Allen PLLC

(57) ABSTRACT

A method for automatic control of an aircraft in event of flight crew incapacity may include determining any incapacity of the flight crew. The method may also include providing a message requiring acknowledgement from the flight crew in response determining incapacity of the flight crew. The method may additionally include commanding an auto pilot to control the aircraft in response to not receiving acknowledgement from the flight crew.

21 Claims, 5 Drawing Sheets

AUTOMATIC CONTROL OF AN AIRCRAFT IN THE EVENT OF FLIGHT CREW INCAPACITY

FIELD

The present disclosure relates to aerospace vehicles or aircraft and avionics for interfacing with such vehicles, and more particularly to a method and system for automatic control of an aircraft in the event of incapacity of the flight crew.

BACKGROUND

Under certain circumstances, a flight crew or pilots of an aircraft may become incapacitated and unable to control the aircraft. One example of the flight crew becoming incapacitated may be decompression of the cockpit or cabin of the aircraft above an altitude where oxygen is needed by the crew or for some other reason there is a lack of oxygen in the cockpit or cabin. Hypoxia or lack of oxygen will cause the judgment of the crew to be impaired and eventually the crew will loose consciousness. Under such circumstances, an ability to descend the aircraft to an altitude where sufficient oxygen is present to sustain human life and to permit possible revival of the crew is needed along with the aircraft being able to be flown safely while the crew is incapacitated.

Another example where the flight crew may become incapacitated is an unauthorized pilot taking over control of the aircraft or some other impairment of the authorized flight crew. Under this scenario, the aircraft may be flown in an unsafe erratic manner or flown to a destination other than that programmed or in the flight plan. Under such circumstances, an ability to regain control of the aircraft and direct it to a safe area where minimal if any damage to other aircraft or objects on the ground is desirable.

SUMMARY

In accordance with an embodiment, control of an aircraft may be automatically taken over by an on-board system after sensing absence of heuristic human behavior by the flight crew or pilot or when the aircraft seems to be operated in an erratic manner or being flown in an unintended manner or heading. Operation in an erratic or unintended manner may be either because the flight crew may be suffering from a lack of oxygen or hypoxia; an unauthorized pilot may have taken control of the aircraft or for some other reason the aircraft is not being operated properly. If the system detects that the aircraft is not being operated as expected (lack of inputs, or unusual inputs), the system may request the pilot or flight crew to respond to an alert, message or other stimulus. If an appropriate response, such as a security code or password is not received, the system may automatically take over control of the aircraft. The system may also transmit a communication or predetermined message to alert a ground station, such as air traffic control, a control tower or other facility that the aircraft is being automatically controlled by the system. In the case of an unauthorized pilot or impairment of the regular flight crew, if attempts are made to fly the aircraft erratically or to a destination other than programmed or in a flight plan, the system will require an override code to be entered. In the case of hypoxia, the aircraft automatic control system would engage flight controls and auto throttle control and use a terrain following feature to decrease altitude to a level where there is sufficient oxygen for human existence and possible revival of the crew. The system may also fly the aircraft to the nearest airport or landing site. The system may signal the tower at the airport and circle over the destination. If the crew does not respond, the aircraft may be flown to a safe area, such as over the ocean or other deserted area, to avoid ground collateral damage before the aircraft runs out of fuel.

In accordance with an embodiment, a method for automatic control of an aircraft in event of flight crew incapacity may include determining any incapacity of the flight crew. The method may also include providing a message requiring acknowledgement from the flight crew in response to determining incapacity of the flight crew. The method may additionally include commanding an auto pilot to control the aircraft in response to not receiving the acknowledgement from the flight crew.

In accordance with another embodiment, an on-board system for automatic control of an aircraft in event of flight crew incapacity may include a processor and a module operating on the processor for automatic control of the aircraft in event of flight crew incapacity. The module may be adapted to determine any incapacity of the flight crew and to provide a message requiring acknowledgement from the flight crew in response to determining incapacity of the flight crew to control the aircraft. The on-board system may also include an auto pilot to control the aircraft in response to not receiving the acknowledgement from the flight crew.

In accordance with another embodiment, a computer program product for automatic control of an aircraft in event of flight crew incapacity may include a computer readable storage medium. The computer readable storage medium may have computer readable program code embodied therewith. The computer readable program code may include computer readable program code configured to determine any incapacity of the flight crew. The computer readable program code may also include computer readable program code configured to provide a message requiring acknowledgement from the flight crew in response to determining incapacity of the flight crew. The computer readable program code may additionally include computer readable program code configured to command an auto pilot to control the aircraft in response to not receiving the acknowledgement from the flight crew.

Other aspects and features of the present disclosure, as defined solely by the claims, will become apparent to those ordinarily skilled in the art upon review of the following non-limited detailed description of the disclosure in conjunction with the accompanying figures.

BRIEF DESCRIPTION OF THE SEVERAL VIEWS OF THE DRAWINGS

The following detailed description of embodiments refers to the accompanying drawings, which illustrate specific embodiments of the disclosure. Other embodiments having different structures and operations do not depart from the scope of the present disclosure.

DESCRIPTION

Figure 1A:
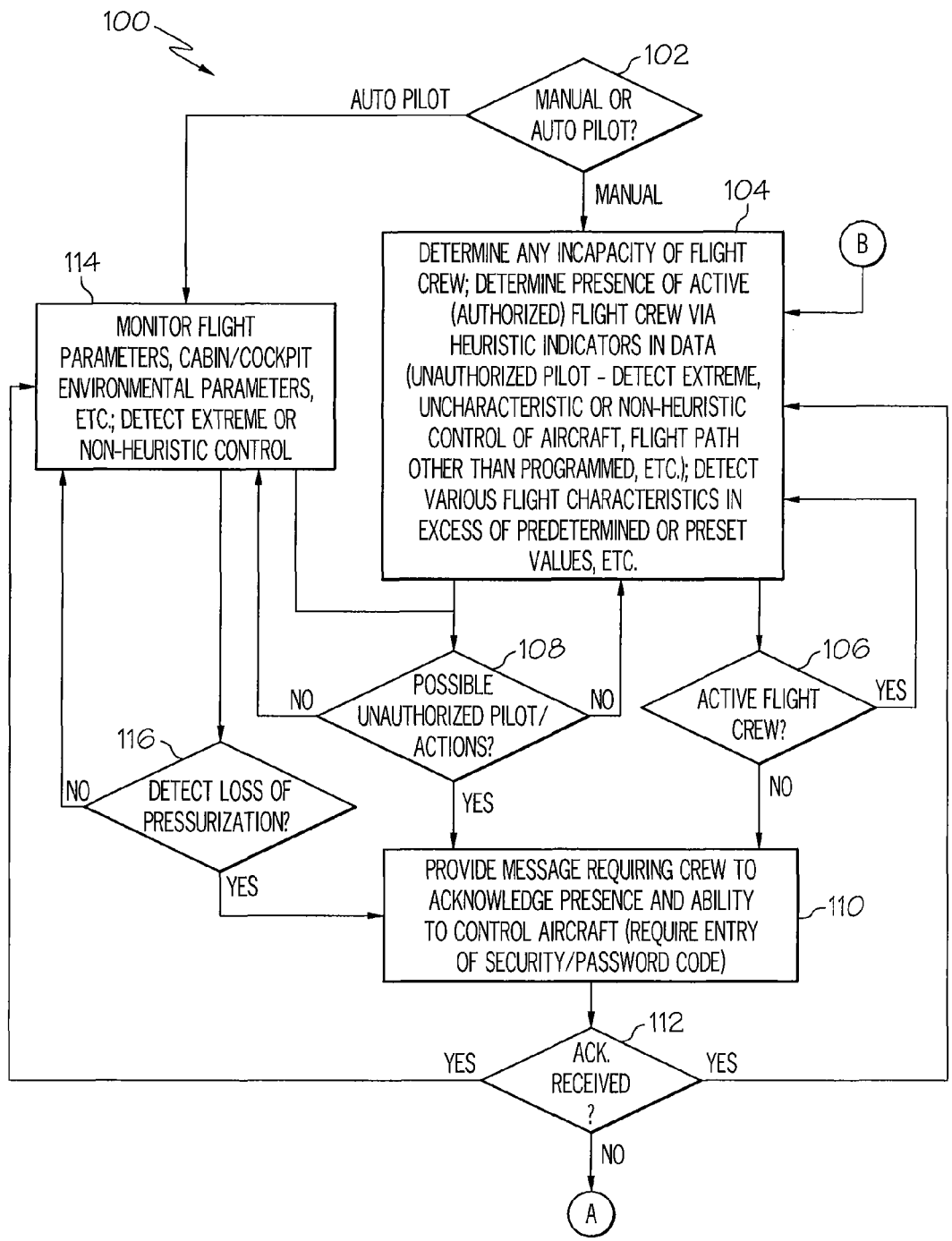
FIGS. 1A and 1B (collectively FIG. 1) is a flow chart of an example of a method for automatic control of an aircraft in the event of incapacity of the flight crew in accordance with an embodiment of the present disclosure.

The following detailed description of embodiments refers to the accompanying drawings, which illustrate specific embodiments of the disclosure. Other embodiments having different structures and operations do not depart from the scope of the present disclosure.

As will be appreciated by one of skill in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1B:
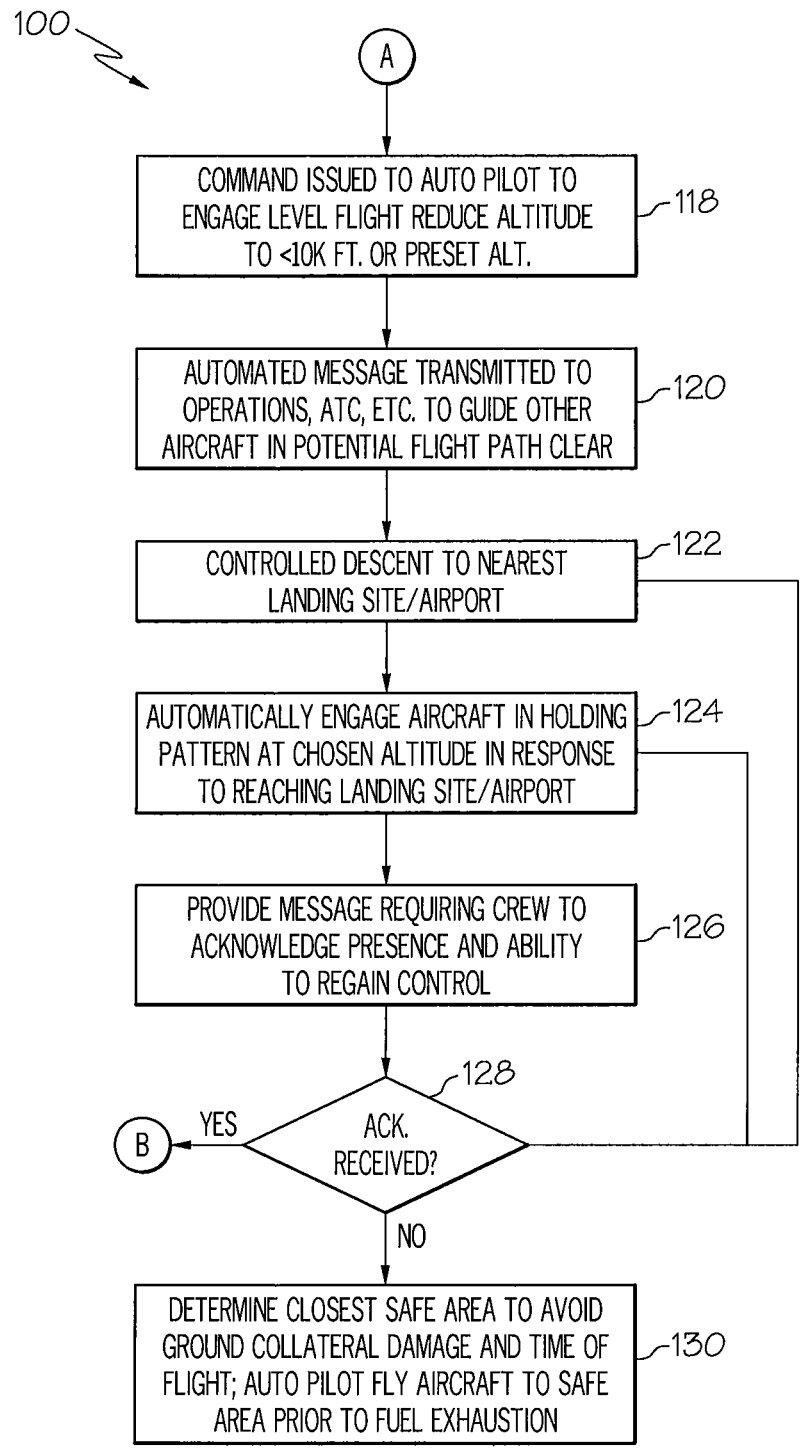

FIGS. 1A and 1B (collectively FIG. 1) is a flow chart of an example of a method 100 for automatic control of an aircraft in the event of incapacity of the flight crew in accordance with an embodiment of the present disclosure. In block 102, a determination may be made whether the aircraft is being operated under manual control by the flight crew or pilot or whether the auto pilot is controlling operation of the aircraft. If the flight crew is manually controlling the aircraft, the method 100 may advance to block 104. In block 104 the presence of an active flight crew may be determined via heuristic indicators in the flight data. Heuristic indicators in the flight data may include but is not necessarily limited to the normal or usual and expected flight control inputs by a human flying the aircraft, such as for example manipulation of the stick or yoke of the aircraft in controlling ailerons, the elevator or other flight controls, movement of the foot control pedals to control movement of the rudder, and any other actions that may be taken by a pilot or copilot in manually flying the aircraft. These heuristic indicators may be programmed into the system and method 100 and compared to actual actions by the pilot or copilot to determine the presence of an active flight crew or pilot.

Determining the presence of an active flight crew may also include determining whether an authorized pilot or flight crew is in control of the aircraft or there may be some other incapacity or impairment of the flight crew of pilot. For example, the method 100 may detect extreme, uncharacteristic or non-heuristic control of the aircraft, a flight path or heading other than programmed or flight planned, or other anomalous flight characteristic or behavior. Various flight characteristics in excess of predetermined or preset values may be detected. The flight characteristics may be detected by various sensors and compared to the heuristic data or indicators. Examples of the various flight characteristics that may be detected and evaluated to determine the presence of an active crew and an authorized crew may include but is not necessarily limited to a roll and roll rate of the aircraft, pitch and pitch rate of the aircraft, yaw and yaw rate of the aircraft, altitude, heading and speed of the aircraft, configuration of the aircraft, and envelope data related to the operational bounds, tolerances or other specifications of the aircraft for different maneuvers, or other actions. Any of these various flight characteristics outside the norm or that are uncharacteristic or that exceed preset limits or values may indicate a possible unauthorized pilot or an impaired pilot.

In block 106, a determination may be made whether an active flight crew is present and manually flying the aircraft based on the parameters and determinations in block 104. If a determination is made that an active flight crew is present, the method 100 may return to block 104. If a determination is made that an active flight crew is not present, the method 100 may advance to block 110.

In block 108, a determination may be made whether a possible unauthorized pilot or impaired pilot is in control of the aircraft or other unusual or extreme actions or behavior have occurred based on the analysis in block 104. If a determination is made in block 108 that a possible unauthorized pilot is in control, the method 100 may advance to block 110. Otherwise, the method 100 may return to block 104.

In block 110, a message, alert or other stimulus may be provided to the pilot or crew. The message or alert may be presented on a display in the cockpit, such as a display associated with an electronic flight bag (EFB), a display associated with a flight management computer (FMC) or other cockpit display. The message or alert may require the pilot or crew to acknowledge presence and ability to control the aircraft. The message or alert may require that the crew or pilot enter a security code or password that would only be known by an authorized pilot or crew member. In block 112, a determination may be made whether an acknowledgment or the correct security code or password was entered into the system. If the acknowledgment or correct code was received in block 112, the method 100 may return to block 104.

Returning to block 102, if a determination is made in block 102 that the aircraft is being controlled by the autopilot, the method 100 may advance to block 114. In block 114, flight parameters and cockpit or cabin environmental parameters may be monitored as well as any other parameters for detecting normal operation of the aircraft. Any extreme or non-heuristic control of the aircraft, similar to that described with reference to block 104, may also be evaluated in block 114 to detect a possible unauthorized pilot or extreme or unauthorized control of the aircraft. Any loss of cabin or cockpit pressurization may also be detected in block 114. Detecting the loss of pressurization may involve detecting a pressurization decrease faster than a predetermined rate.

Similar to that previously described, a determination may be made in block 108 whether there is a possible unauthorized pilot in control of the aircraft or other unauthorized or extreme operation of the aircraft is occurring. If not, the method 100 may return to block 114. If a determination is made in block 108 that the aircraft may be under control of unauthorized pilot, the method 100 may advance to block 110 and the functions of block 110 may be performed similar to that previously described and the pilot will be required to enter a security code or password to prevent command override or to regain control of the aircraft.

In block 116, a determination may be made whether a loss of pressurization was detected in block 114. If a loss of pressurization was not detected, the method 100 may return to block 114. If a loss of pressurization was detected in block 116, the method 100 may advance to block 110 and the functions of block 110 may be performed. If an acknowledgment or security code or password is determined to be received in block 112, the method 100 may return to block 114 and the method 100 may proceed as previously described. If an acknowledgment or the correct security code or password was not received in block 112, the method 100 may advance to block 118.

In block 118, a command override may be engaged and a command may be issued to the autopilot to control the aircraft. The auto pilot may be commanded to engage level flight and to reduce altitude to a preset altitude. For example the preset altitude may be an altitude less than about 10,000 feet or at an altitude where there is sufficient oxygen for breathing by the flight crew without any assistance or supplemental oxygen and to permit possible recovery by the flight crew if suffering from hypoxia. An example of a display 300 that may be presented in the cockpit of the aircraft to indicate command override and that the autopilot is controlling the aircraft will be described in more detail herein with reference to FIG. 3.

In block 120, a message or communication may be automatically transmitted to a ground station, such as airline operations, air traffic control or other facility. The message or communication may permit other aircraft to be guided clear of the potential flight path of the aircraft.

In block 122, the auto pilot may initiate a controlled descent to the nearest landing site or airport. In block 124, the autopilot may automatically engage the aircraft in a holding pattern at a chosen altitude in response to reaching the landing site or airport.

In block 126, another message or alert may be provided to the crew. The message or alert may require the crew to acknowledge presence and ability to regain control of the aircraft. The message may also require entry of a security code or password to confirm that control of the aircraft would be regained by an authorized pilot.

Figure 4:
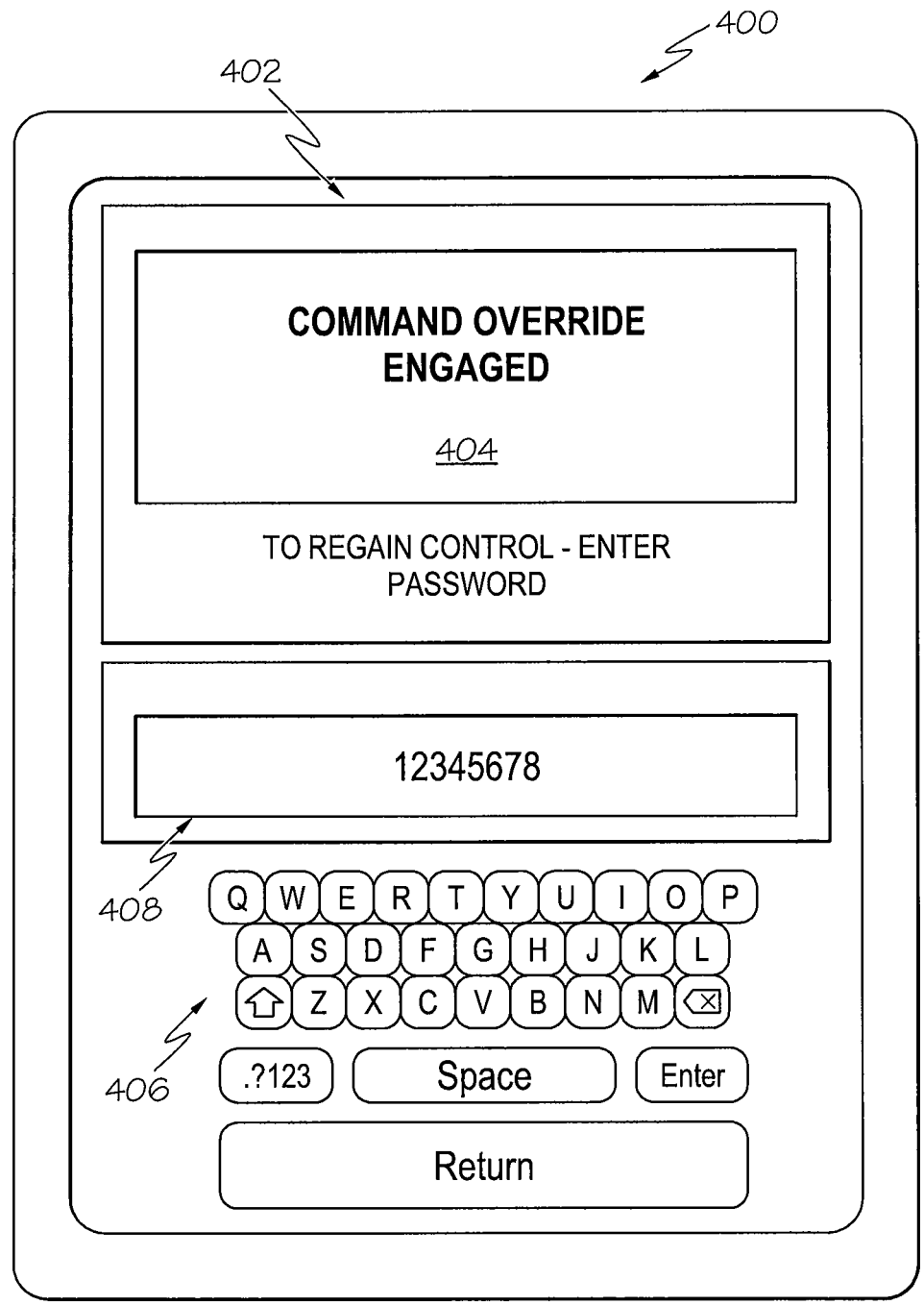
FIG. 4 is an example of a cockpit display illustrating a message for the flight crew to acknowledge to regain control of the aircraft in accordance with an embodiment of the present disclosure.

In block 128, a determination may be made if an acknowledgment was received and/or the correct security code or password was entered to regain control of the aircraft. An example of a display 400 including a message or alert requiring the crew to acknowledge presence and to enter a security code or password is illustrated in FIG. 4. At any time during the operations associated with blocks 122, 124 and 126, the pilot or flight crew may acknowledge presence in block 128 and may regain control of the aircraft by entering the appropriate security code or password.

If a determination is made in block 128 and an acknowledgment or correct security code was received, the method 100 may return to block 104 and the method 100 may proceed similar to that previously described. If an acknowledgment or correct security code is not received in block 128, the method 100 may advance to block 130. In block 130, the closest safe area to avoid ground collateral damage and time of flight may be determined. The auto pilot may then fly the aircraft to the safe area prior to fuel exhaustion. The safe area may be over the ocean or over some deserted land area.

Figure 2:
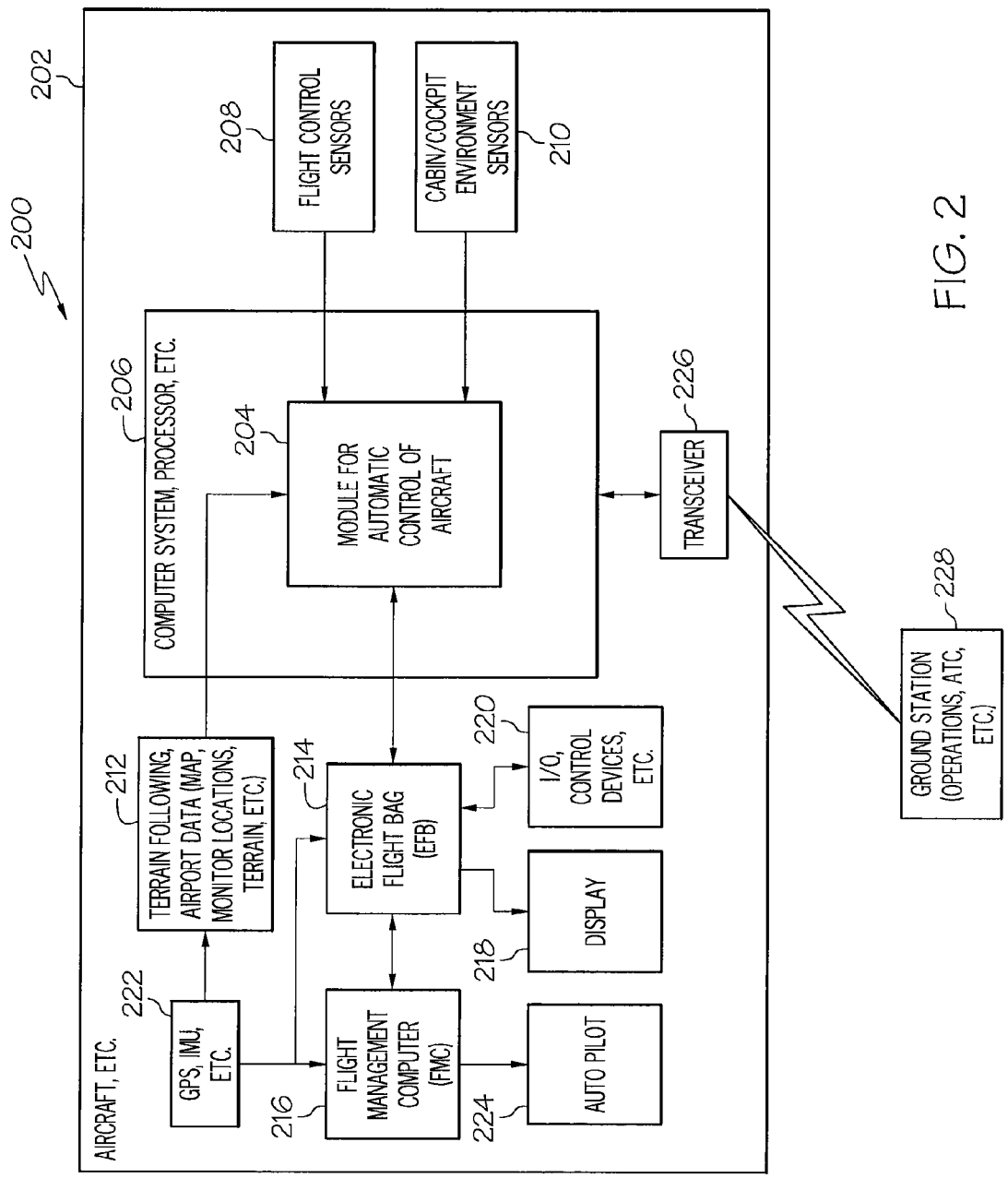
FIG. 2 is a block schematic diagram of an example of a system on board an aircraft for automatic control of the aircraft in the event of incapacity of the flight crew in accordance with an embodiment of the present disclosure.

FIG. 2 is a block schematic diagram of an example of a system 200 on board an aircraft 202 for automatic control of the aircraft 202 in the event of incapacity of the flight crew in accordance with an embodiment of the present disclosure. The method 100 may be embodied in the system 200. The system 200 may include a module for automatic control of the aircraft 202. The automatic control module 204 may be stored on and/or operable on a computer system 206 or processor. Some or all of the features of the method 100 may be embodied in and performed by the automatic control module 204. The computer system 206 may be disposed or mounted in the aircraft 202.

The automatic control module 204 may receive data from flight control sensors 208 and cabin/cockpit environment sensors 210. The flight control sensors 208 may sense any extreme or excess operation of the flight controls of the aircraft similar to that previously described. The cabin/cockpit environment sensors 210 may sense any loss of cabin pressurization.

The automatic control module 204 may also receive information or data from a terrain following feature or unit 212. The terrain following feature or unit 212 may also include airport data and may include maps of the geographic area along a potential flight path to the nearest airport or landing site.

The automatic control module 204 may also interface with, or may be hosted by an electronic flight bag (EFB) 214. An EFB 214 is an electronic information management device that may be provided onboard an airplane to assist flight crews in performing flight management tasks more easily and efficiently. The EFB 214 may be a general purpose computer or computing platform intended to reduce, or replace, paper-based reference material formerly contained in a pilot's carry-on flight bag. Such materials may have included aircraft operating manual, aircrew operating manual, navigation charts including maps for air and ground operations and other materials for flight operations. The EFB 214 includes electronic moving maps for ground and air operations. In addition, the EFB 214 can host software applications for specific purposes to automate other operations normally or formerly conducted manually by the pilot, such as performing take-off calculations and other flight related tasks.

The EFB 214 may be coupled to a flight management computer (FMC) 216. The FMC 216 and EFB 214 may provide key airplane and engine performance parameters to the automatic control module 204 to support automatic control of the aircraft as described herein. The FMC 216 may be part of or integrated into the computer system 206 or the module for automatic control of the aircraft 204 may operate on the FMC 216 rather than the system including a separate computer system 206 as illustrated in the example of FIG. 2.

A display 218 and input/output control devices 220 or means may be associated with the EFB 214 or a separate display and controls may be associated with the automatic control module 204.

A global position system (GPS) 222, inertial measuring unit (IMU) or other device may provide geographic location information to the FMC 216 and EFB 214 for use in automatic control of the aircraft 202.

The auto pilot 224 may be controlled via the FMC 216 by the automatic control module 204 or the auto pilot 224 may be controlled directly by the automatic control module 204.

A transceiver 226 may be coupled to the computer system 206 for communicating with a ground station and for sending any automatic messages similar to that described herein related to the aircraft being controlled by the auto pilot 224 or being in a command override mode in the event of incapacity of the flight crew as described herein.

Figure 3:
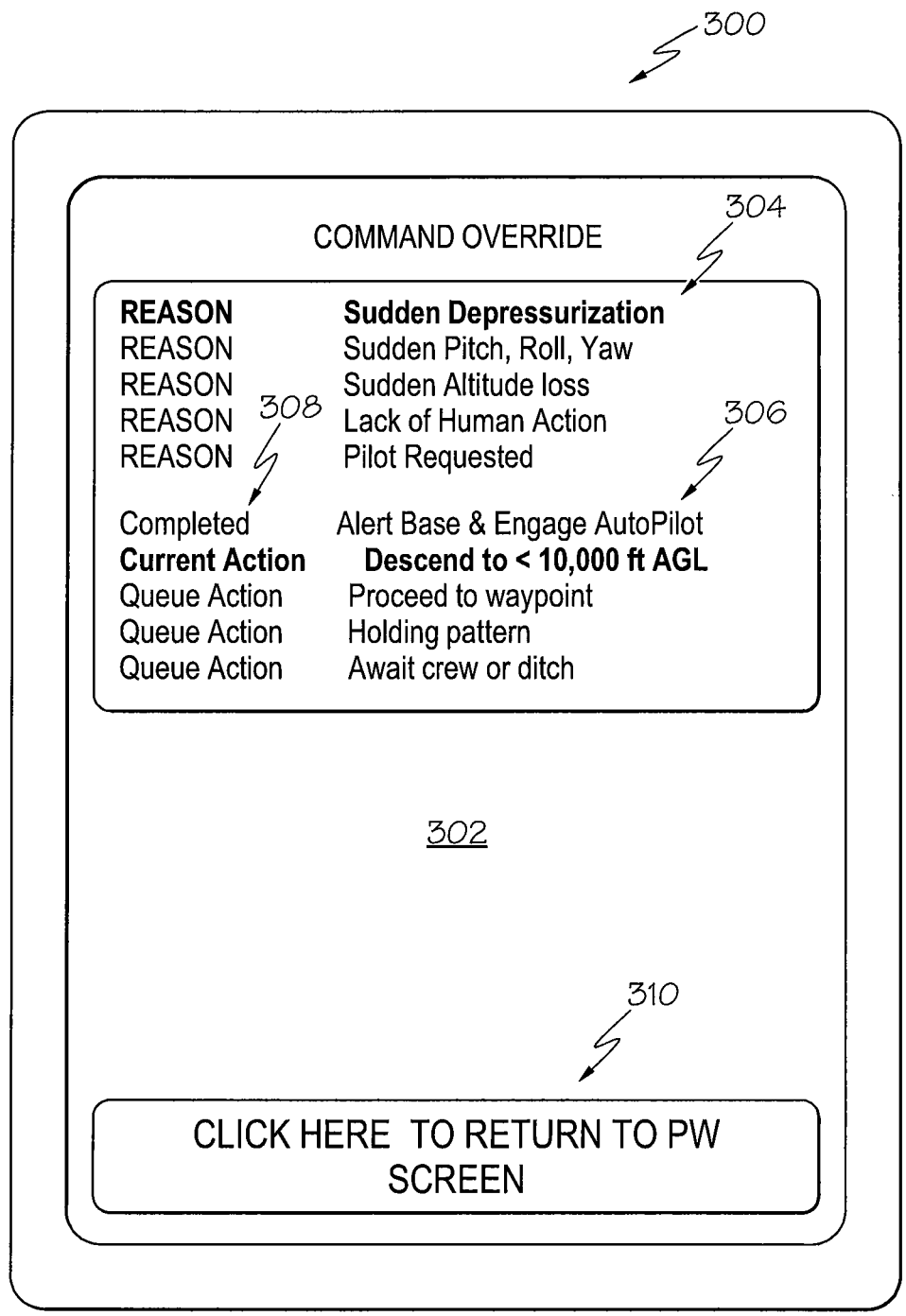
FIG. 3 is an example of a cockpit display illustrating a command override or automatic control of an aircraft in the event of incapacity of the flight crew in accordance with an embodiment of the present disclosure.

FIG. 3 is an example of a cockpit display 300 illustrating a command override or automatic control of an aircraft in the event of incapacity of the flight crew in accordance with an embodiment of the present disclosure. The display 300 may be used for the display 218 in FIG. 2 and may be associated with an EFB. The display 300 presenting a command override screen 302 may present information associated with command override or automatic operation of the aircraft by the auto pilot. For example, the command override screen 302 may include a first list 304 illustrating possible reasons for the command override or automatic control of the aircraft by the auto pilot and a second list of possible actions 306 and a current status 308 associated with each action 306.

Examples of possible reasons 304 that may be displayed for command override illustrated in FIG. 3 include "Sudden Depressurization", "Sudden Pitch, Roll, Yaw", "Sudden Altitude loss", "Lack of Human Action", and "Pilot Request". These possible reasons are merely illustrative examples and other possible descriptions of reasons for command override or automatic control of an aircraft may be used in addition to other possible reasons. The reason detected for the current override may be highlighted in some manner to be distinguishable from the other reasons for possible command override when viewed by the flight crew. For example, the current reason may be bolded and/or may be a different color that stands out from the other listed reasons for command override.

Examples of possible actions 306 that may be taken during command override illustrated in FIG. 3 may in collude "Alert Base and Engage Auto Pilot", "Descend to <10,000 ft AGL", "Proceed to waypoint", "Holding pattern", and "Await crew or ditch". The current action 306 may be highlighted or otherwise distinguished from the other actions in the list for easy visibility and recognition by the flight crew. For example, the current action may be bolded and/or may be a different color. Additionally, the status 308 associated with the current action may read "Current Action" as illustrated in FIG. 3 associated with the action "Descend to <10,000 ft AGL". Examples of other action statuses may be "Completed" and "Queue Action".

The Command Override screen 300 may also include a feature 310 that may be operated to return to a PW screen or screen to regain control of the aircraft by an authorized flight crew or pilot.

FIG. 4 is an example of a cockpit display 400 illustrating a screen 402 for the flight crew to acknowledge and to regain control of the aircraft in accordance with an embodiment of the present disclosure. The screen 402 may include a first area 404 providing a message that the command override is engaged. The first area 404 may also include a message that to regain control a password must be entered. The display 400 may also include a feature 406 for entering the password or security code. The feature 406 for entering the password may be a touch keyboard or keypad presented on the screen 402 similar to that illustrated in FIG. 4 or may be by an actual keyboard or keypad or by any other suitable mechanism. The password to regain control of the aircraft may then be entered by operation of the keyboard or keypad feature 406 by a flight crew member. As a crew member enters the password, the password may appear in a second area 408 on the screen 402 for verification by the crew member.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the embodiments herein have other applications in other environments. This application is intended to cover any adaptations or variations of the present disclosure. The following claims are in no way intended to limit the scope of the disclosure to the specific embodiments described herein.

What is claimed is:

1. A method for automatic control of an aircraft in event of flight crew incapacity, comprising:
   determining any incapacity of the flight crew;
   providing a message on a cockpit display requiring acknowledgement from the flight crew in response to determining incapacity of the flight crew, wherein requiring acknowledgement from the flight crew comprises receiving a security code that would only be known by an authorized flight crew member;
   commanding an auto pilot to control the aircraft in response to not receiving the acknowledgement from the flight crew;
   controlling the aircraft to a landing site by the auto pilot in response to the auto pilot being commanded to control the aircraft;
   providing another message requiring acknowledgement from the flight crew when the aircraft reaches the landing site, wherein requiring acknowledgement from the flight crew comprises receiving the security code;
   determining a safe area to avoid ground collateral damage and time of flight to the safe area before fuel exhaustion in response to not receiving the security code responsive to the other message; and
   flying the aircraft to the safe area prior to fuel exhaustion in response to not receiving the security code responsive to the other message.

2. The method of claim 1, wherein determining any incapacity of the flight crew comprises determining the presence of an active flight crew by evaluating heuristic indicators in flight data corresponding to the aircraft being controlled by an actual person when the aircraft is under manual control.

3. The method of claim 1, further comprising:
   monitoring flight control parameters to detect any non-heuristic control of the aircraft; and
   monitoring cockpit environmental parameters to detect the loss of aircraft pressurization.

4. The method of claim 1, wherein determining any incapacity of the flight crew comprises at least one of:
   detecting a roll and roll rate of the aircraft in excess of a predetermined roll and roll rate value;
   detecting a pitch and pitch rate of the aircraft in excess of a predetermined pitch and pitch rate value;
   detecting a yaw and yaw rate of the aircraft in excess of a predetermined yaw and yaw rate;
   detecting an altitude different from an authorized or preset altitude;
   detecting a heading different from an authorized or planned heading;
   detecting a speed different from an authorized or predetermined speed;
   detecting an aircraft configuration different from an expected configuration for a particular flight stage; and
   detecting envelope data different from an expected envelope for the particular flight stage.

5. The method of claim 1, wherein providing a message requiring acknowledgement from the flight crew comprises providing the message in response to detecting loss of pressurization in the aircraft.

6. The method of claim 1, wherein commanding an auto pilot to control the aircraft in response to not receiving the acknowledgement from the flight crew comprises commanding the auto pilot to engage in level flight and to reduce altitude to a preset altitude.

7. The method of claim 6, wherein the preset altitude in is at or below about 10,000 feet.

8. The method of claim 1, further comprising:
   detecting control of the aircraft by an unauthorized pilot;
   requiring entry of the security code; and
   commanding the auto pilot to control the aircraft in response to not receiving the security code or receiving an incorrect security code.

9. The method of claim 8, further comprising transmitting an automated message to a ground station in response to the auto pilot taking control of the aircraft.

10. The method of claim 1, further comprising transmitting an automated message to a ground station in response to the auto pilot taking control of the aircraft.

11. The method of claim 10, further comprising transmitting the automated message to one of an operations center and air traffic control to guide other aircraft clear of a potential flight path of the aircraft.

12. The method of claim 1, further comprising automatically engaging the aircraft in a holding pattern at a chosen altitude by the automatic pilot in response to reaching the landing site.

13. An on-board system for automatic control of an aircraft in event of flight crew incapacity, the system comprising:
   a processor;
   a module operating on the processor for automatic control of the aircraft in event of flight crew incapacity, wherein the module is adapted to determine any incapacity of the flight crew and to provide a message on a cockpit display requiring acknowledgement from the flight crew in response to determining incapacity of the flight crew, wherein the acknowledgement from the flight crew comprises a security code that would only be known by an authorized flight crew member;

an auto pilot to control the aircraft in response to not receiving the acknowledgement from the flight crew, wherein the auto pilot controls the aircraft to a landing site in response to the auto pilot being commanded to control of the aircraft;

another module, operating on the processor, being configured to provide another message requiring acknowledgement from the flight crew when the aircraft reaches the landing site, wherein requiring acknowledgement from the flight crew comprises receiving the security code; and a further module, operating on the processor, being configured to determine a safe area to avoid ground collateral damage and time of flight to the safe area before fuel exhaustion in response to not receiving the security code responsive to the other message; and the auto pilot flying the aircraft to the safe area prior to fuel exhaustion in response to not receiving the security code responsive to the other message.

14. The on-board system of claim 13, further comprising:
the cockpit display being configured to provide the message requiring acknowledgement from the flight crew; and
an input device for entering the acknowledgement by the flight crew.

15. The on-board system of claim 13, further comprising:
a sensor to detect manual commands from the flight crew, wherein incapacity of the flight crew is determinable by the sensor not detecting any manual commands from the flight crew when the aircraft is being manually operated or the sensor detecting uncharacteristic control of the aircraft; and
a sensor to detect a depressurization of the aircraft.

16. A computer program product for automatic control of an aircraft in event of flight crew incapacity, the computer program product comprising:
a non-transitory computer readable storage medium having computer readable program code embodied therewith, the computer readable program code comprising:
computer readable program code configured to determine any incapacity of the flight crew;
computer readable program code configured to provide a message on a cockpit display requiring acknowledgement from the flight crew in response to determining incapacity of the flight crew to control the aircraft, wherein the acknowledgement from the flight crew comprises a security code that would only be known by an authorized flight crew member;
computer readable program code configured to command an auto pilot to control the aircraft in response to not receiving the acknowledgement from the flight crew;
computer readable program code configured to control the aircraft to a landing site by the auto pilot in response to the auto pilot being commanded to control the aircraft;
computer readable program code configured to provide another message requiring acknowledgement from the flight crew when the aircraft reaches the landing site, wherein requiring acknowledgement from the flight crew comprises receiving the security code;
computer readable program code configured to determine a safe area to avoid ground collateral damage and time of flight to the safe area before fuel exhaustion in response to not receiving the security code responsive to the other message; and
computer readable program code configured to fly the aircraft to the safe area prior to fuel exhaustion in response to not receiving the security code responsive to the other message.

17. The computer program product of claim 16, wherein the computer readable program code configured to determine presence of an active flight crew comprises computer readable program code configured to evaluate heuristic indicators in flight data corresponding to the aircraft being controlled by an actual person when the aircraft is under manual control.

18. The computer readable program code of claim 16, wherein the computer readable program code configured to command the auto pilot comprises:
computer readable program code configured to command the auto pilot to control a descent of the aircraft to a nearest landing site or airport; and
computer readable program code configured to automatically engage the aircraft in a holding pattern at a chosen altitude in response to reaching the landing site or airport.

19. The method of claim 1, further comprising presenting a command override screen on the cockpit display to the flight crew in response to the auto pilot automatically taking control of the aircraft, wherein presenting the command override screen comprises presenting a list of possible reasons for the autopilot automatically taking control.

20. The method of claim 1, further comprising highlighting the reason in the list of possible reasons for the autopilot automatically taking control of the aircraft.

21. The method of claim 1, wherein presenting the command override screen comprises presenting another list, the other list comprising a list of actions associated with the reasons for the autopilot automatically taking control of the aircraft and a current status of each action.

* * * * *